J. S. Jones,
Straw Cutter,

No. 101,741.  Patented Apr. 12, 1870.

Witnesses:
A. Bennerkendorf
W. H. Clark

Inventor:
J. S. Jones
per Munn & Co.

United States Patent Office.

JOHN S. JONES, OF COVINGTON, INDIANA.

Letters Patent No. 101,741, dated April 12, 1870.

IMPROVEMENT IN STRAW-CUTTER.

The Schedule referred to in these Letters Patent and making part of the same

*To all whom it may concern:*

Be it known that I, JOHN S. JONES, of Covington, in the county of Fountain and State of Indiana, have invented a new and useful Improvement in Straw-Cutters; and I do hereby declare that the following is a full, clear, and exact description thereof, which will enable others skilled in the art to make and use the same, reference being had to the accompanying drawings forming part of this specification.

My invention has for its object to improve the construction of straw-cutters, so as to make them more convenient and effective in use, enabling them to cut the straw or hay entirely off and to feed the said straw or hay forward automatically; and It consists in the construction and combination of the various parts of the machine, as hereinafter more fully described.

A is the feed-box, which is supported upon legs B of suitable length, and in such a way that the forward end of said feed-box may incline slightly downward.

To the forward end of the cutter A B is attached the frame-work F, in the center of which are placed the bearings for the shaft, C, that carries the fly-wheel D.

To the shaft C, or to the inner end of the hub of the wheel D, is attached the heel of the curved knife E, in such a way that the said knife may be carried around by and with the shaft C.

Figure 1:
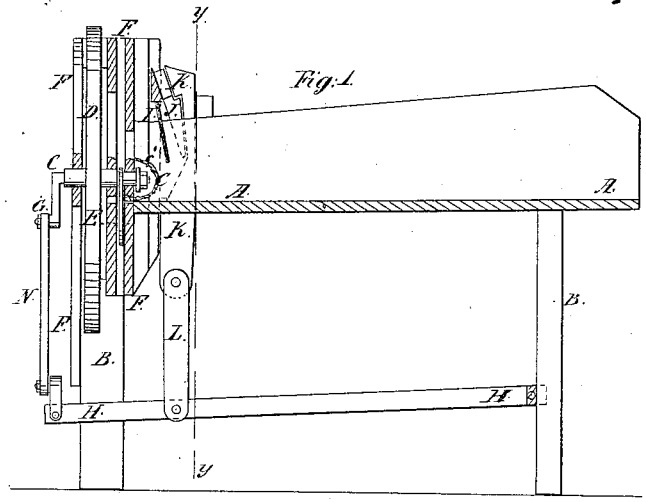
Figure 1 is a detail vertical longitudinal section of my improved straw-cutter, taken through the line $x\,x$, fig. 2.
Figure 2:
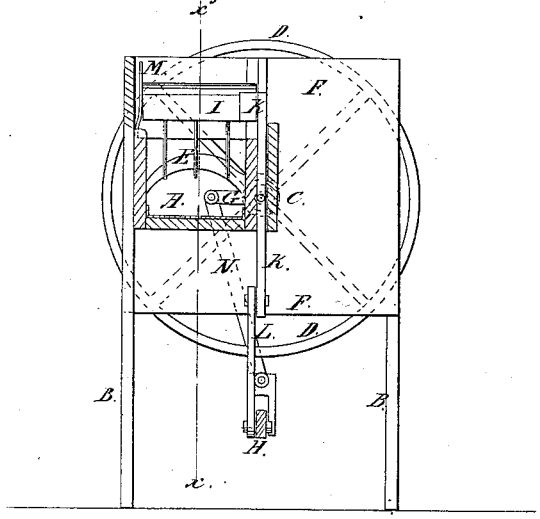
Figure 2 is a detail vertical cross-section of the same, taken through the line $y\,y$, fig. 1.

The shaft C is drawn inward to adjust the knife E close to the mouth of the feed-box A by a nut, $c'$, placed upon the inner end of the shaft C, and kept from being worked off by the revolution of said shaft by a washer, as shown in fig. 1.

The knife E works in a groove, recess, or slot formed in the frame-work F, in front of the mouth of the feed-box A, being so arranged that the forward ends of the straw or hay, when fed forward to be cut, may cross the said slot, and be thus supported while being cut off, so that the knife may make a clean cut.

To the forward end of the shaft C is attached, or upon it is formed, a crank, G, to the crank-pin of which is connected the upper end of the connecting-rod or bar N, the lower end of which is connected by a double-jointed connection to the forward end of the lever H, the rear end of which is pivoted to the rear part of the frame of the machine.

The lever H may be used as a treadle to operate the cutter, or the cutter may be operated by a crank, as may be desired or most convenient.

I is the rake-head, the ends of which move up and down in grooves in or just above the forward end of the feed-box.

The upper edge of the bar of the rake-head I is beveled off upon both sides, so that the rake-head may rock in the grooves, to feed the straw or hay forward by the forward movement of the lower ends of the rake-teeth.

To one end of the rake-head bar is attached the upper end of a vertical bar, J, the forward edge of the upper end and the rear edge of the lower end of which are beveled off or inclined, so that the rake-head may be rocked by the inclines of the slides K.

At the bottom of the lower incline of the slide K is formed a square shoulder, which strikes against the lower end of the bar J, to raise the rake head out of the straw or hay in the feed-box.

At the bottom of the upper incline of the slide K is formed a square shoulder, which strikes against a square shoulder formed upon the edge of the bar J, to force the rake-head down into the straw or hay as it is about to rock to feed the said straw or hay forward.

The lower end of the slide K is connected with the lever by a pivoted connecting-rod or bar, L, so that the feeding device may be operated at the proper time in connection with the knife E and by the same movement.

M is a spring placed in the groove, in which the further end of the rake-head moves to press against the end of the rake-head I, and hold it suspended until drawn down by the contact of the shoulders formed upon the slide K and bar J.

Having thus described my invention,

I claim as new and desire to secure by Letters Patent—

1. The slide K, bar J, and rake-head I, in combination with the feed-box A and lever H, said parts K J I being constructed and operating in connection with the knife E, substantially as herein shown and described and for the purpose set forth.

2. The fly-wheel D, crank-shaft C, rod N, and spring M, in combination with the frame-work F and the devices of the above claim, all arranged to operate as shown and described.

JOHN S. JONES.

Witnesses:
W. PRESCOTT,
A. G. PATTERSON.